April 8, 1958     H. E. ENGLESON ET AL     2,829,478

BOTTLE CONVEYING AND FILLING MACHINE

Filed July 19, 1954     3 Sheets-Sheet 1

INVENTORS:
HARRY E. ENGLESON
ELMER D. SRAMEK
BY Marzall, Johnston, Cook & Root
ATT'YS

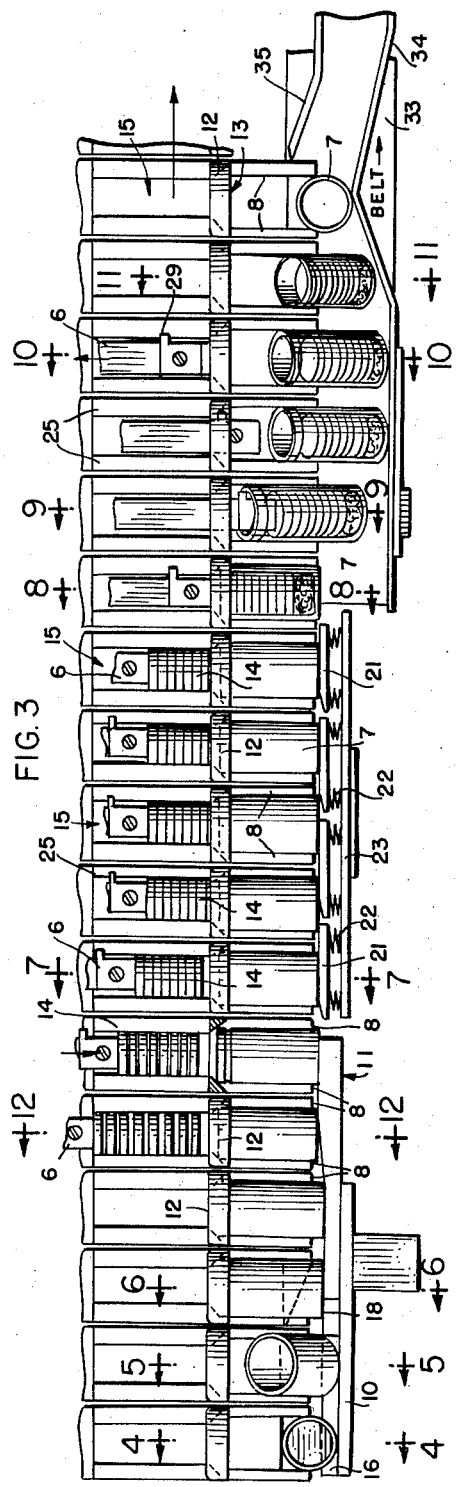

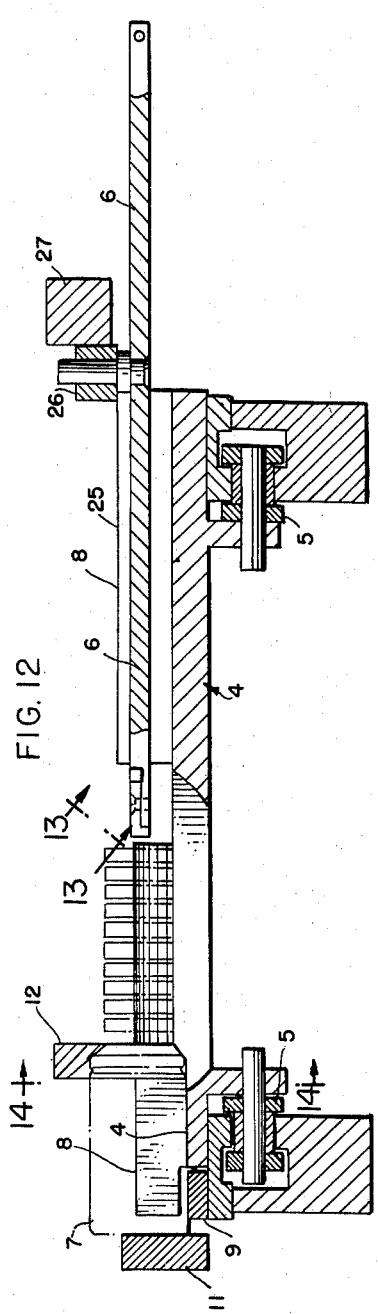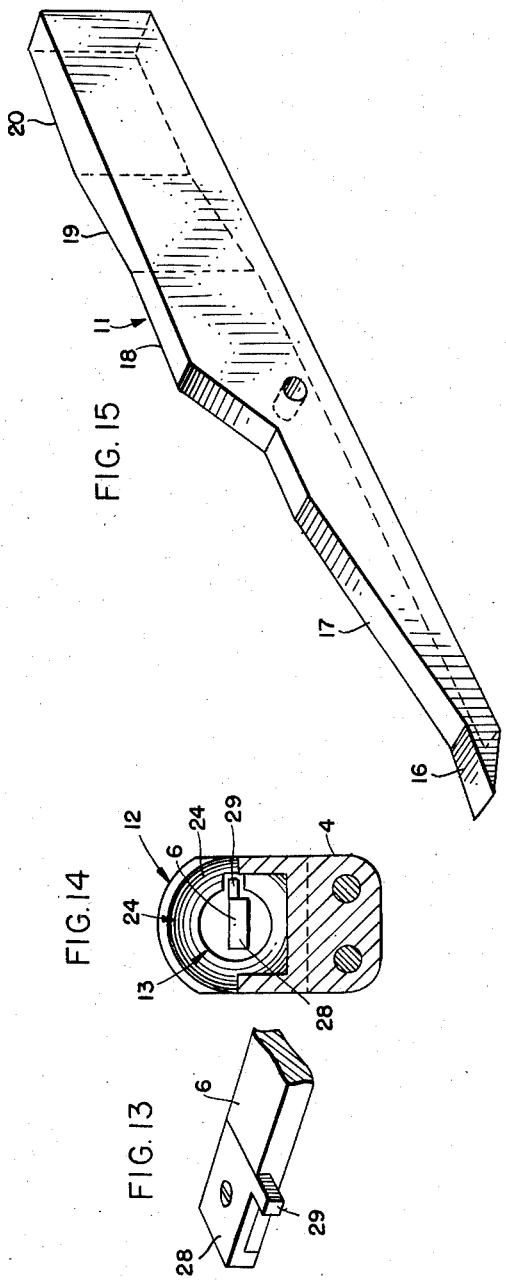

United States Patent Office 2,829,478
Patented Apr. 8, 1958

2,829,478

BOTTLE CONVEYING AND FILLING MACHINE

Harry E. Engleson, Chicago, and Elmer D. Sramek, Cicero, Ill., assignors to F. B. Redington Co., Chicago, Ill., a corporation of Delaware Application July 19, 1954, Serial No. 444,142

19 Claims. (Cl. 53—251)

This invention relates to bottle conveying machines in general, and particularly to a machine to convey bottles to a predetermined position for the reception of articles. More specifically the invention relates to conveying mechanism conveying articles and bottles to predetermined positions for filling the bottles with the articles.

The bottle conveying mechanism of the present invention is adapted for use with the machine disclosed in applicants' copending application Serial No. 429,783 filed May 14, 1954.

The structure of the present invention consists in conveying bottles by the same mechanism which also conveys the articles for insertion into the bottles. The specific articles which are to be bottled comprise tablets standing on end and arranged in horizontal columnar form. The articles in this latter formation are conveyed by a continuously moving conveyer in the form of buckets carried and supported by movable chains. The conveyer also conveys the bottles to article receiving position. The successive horizontal columns of tablets are fed successively and progressively along with the continuous successive progressive movement of the bottles. The bottles are delivered from a source of supply to a transfer device or wheel when bottles are fed successively in position with an articles receiving bucket. The bottles are received from the transfer wheel in side-to-side relation resting on their bottoms with the bottle opening or mouth at the top. The bottles are then caused to tilt progressively to article receiving position where the bottles lie fully on their sides with the open ends of the bottles facing the discharge ends of the buckets. The bottles, after having the articles inserted therein, are shifted vertically, again standing on their bottoms, for conveying to a discharge position, such as to a bottle capper.

An important object of the present invention consists in the provision of new and novel means for feeding bottles continuously to predetermined positions to receive a plurality of tablets arranged on their ends in horizontal columnar form, and inserting such horizontal columns of tablets successively into successive bottles, the filled bottles moving continuously to a discharge position.

Another object of the invention consists in feeding bottles continuously to certain continuously moving article conveying buckets whereby the article are fed successively from the buckets and inserted into successive bottles.

A further object of the invention consists in the provision of new and novel mechanism and devices for moving bottles along predetermined paths and in predetermined positions, whereby horizontal columns of tablets, standing on end, are inserted in the bottles while the bottles are shifted to horizontal position, and then causing the filled bottles to be stood on end in upright position.

A still further object resides in the provision of novel means for causing bottles to be constantly moved, the moving bottles being shifted from a vertical position, and then progressively tilted until they lie on their sides for the insertion of horizontal columnar stacks of articles which are also constantly moving, the filled bottles being then caused to be tilted back to vertical upright position and conveyed to discharge position.

Still another object resides in moving bottles continuously along a given path and in certain given positions to receive articles from a continuously moving bucket conveyer so that successive groups of articles will be fed into successive bottles while the bottles and articles move toward discharge position.

Another object of the invention resides in the provision of a new and novel method of feeding articles of a preferred form and arrangement while the articles are being progressively and constantly conveyed and inserting the articles into bottles which are constantly and progressively conveyed, the bottles being tilted from vertical position to horizontal position for receiving the articles and then tilted upwardly to stand on end after the bottles are filled, and then finally conveyed to discharge position.

Numerous other objects and advantages will be apparent throughout the progress of the specification which follows:

The accompanying drawings illustrate a certain selected embodiment of the invention, and the views therein are as follows:

Fig. 3 is a detail top plan view showing certain structure for shifting the bottles to various poistions as the bottles are being conveyed to, at and from filling position and then to discharge position.

Figs. 4 to 11, inclusive, are detail transverse sectional views on the lines 4—4 to 11—11 of Fig. 3 and showing the progressive stages the bottles assume as they are being conveyed;

Fig. 12 is a detail transverse sectional view on the line 12—12 of Fig. 3 and showing the buckets, their means of attachment to the propelling chains, bottle guide means and other structural elements;

Fig. 13 is a detail perspective view of a pusher arm or ejector, and looking in the direction of the arrows 13—13 of Fig. 12;

Fig. 14 is a detail sectional view on the line 14—14 of Fig. 12 and showing the bottle centering collar; and Fig. 15 is a detail perspective view of a bottle guide and tilting rail or bar.

The particular machine herein shown for the purpose of illustrating the present invention comprises bottle conveying and filling mechanism whereby bottles are filled with stacks of tablets, the tablets being made by a tablet forming mechanism and delivered to a filling zone, as disclosed in the aforesaid copending application Serial No. 429,783. The means and structure for conveying the bottles, tilting the bottles and the insertion of the tablets into the bottles is specifically claimed in the present case.

Figure 1:
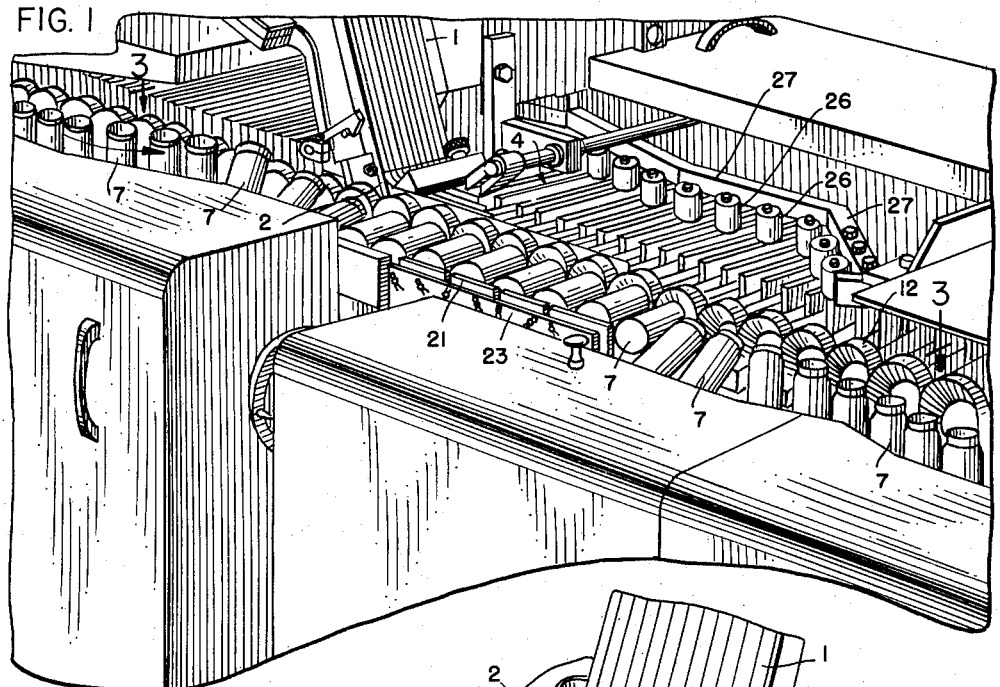
Fig. 1 is a detail perspective view of the machine of the invention embodying mechanism for conveying and arranging bottles to a predetermined position to have articles inserted therein.

Tablets, after being pressed or formed, are delivered into a chute 1, Fig. 1, where they drop by gravity out of the discharge end 2 of the chute. Guide strips 3 at the end of the chute, Fig. 2, define guide channels where the tablets roll on their edges. The tablets as they fall from the chute 1, being guided by the staggered strips 3, are received in conveyer buckets 4. The buckets 4 pass beneath the chute 1, and have semi-circular recesses, to receive tablets one at a time from each of the guide channels. The buckets 4 are hingedly connected together on each side by an operating chain 5, Fig. 12, and are continuously moved forward along a predetermined path. The buckets therefore, in effect, comprise a continuously moving endless conveyor which extends forwardly from a point beyond the end of the chute and moves toward discharge position.

Figure 2:
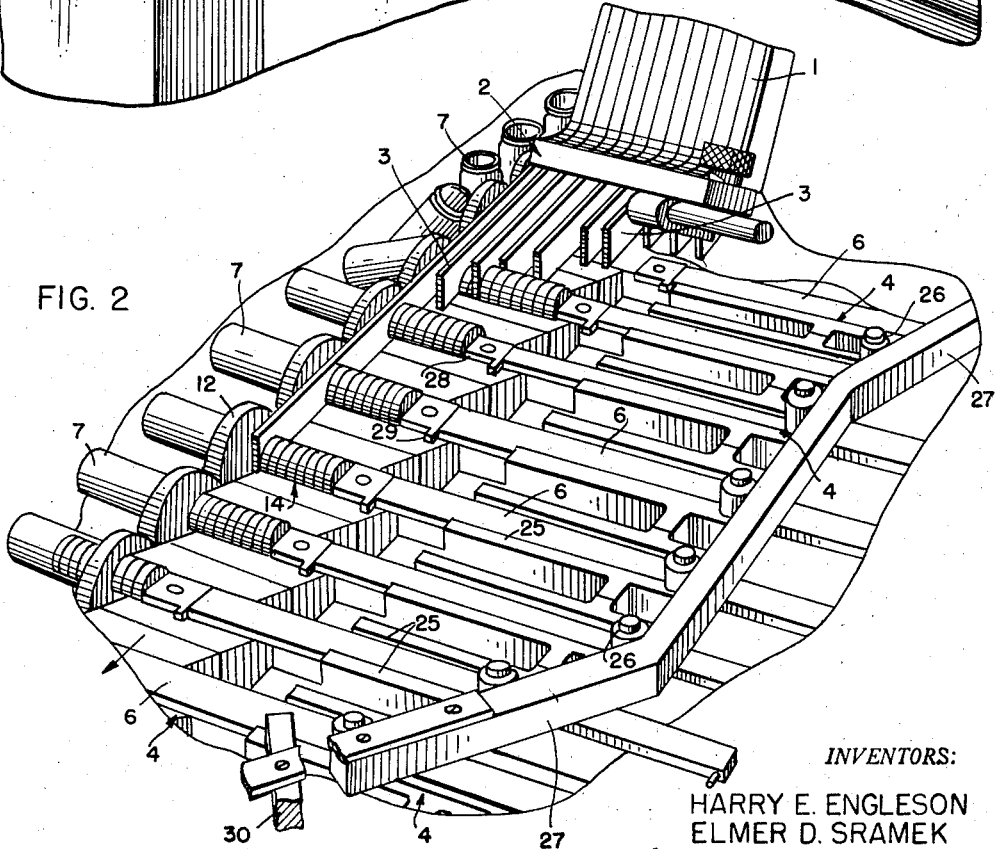
Fig. 2 is a detail perspective view of a part of the conveying mechanism, and showing some of the mechanism for arranging columns of tablets standing on end for insertion into the bottles.

The channels formed by the progressively elongated dividing strips 3, as shown in Fig. 2, each carry a tablet on end, and while the tablets are arranged on end, and in side-by-side relation, they are moved inwardly by pusher arms 6, Figs. 2, 12 and 13, which move progressively at a given rate of speed. As soon as a tablet from the last channel or guideway reaches beyond the end of the last guide strip 3, all the tablets (eight being shown) will be arranged on end, and in side contacting relationship, ready for insertion into bottles 7, Figs. 1 to 11.

The bottles 7, Fig. 1, are conveyed from a suitable source of supply, being moved into position by a transfer wheel (not shown), where they will be received consecutively into receiving openings between rigid side members 8; the members 8 forming the bottle receiving openings may comprise an integral part of the buckets or holders 4, Figs. 3 and 12. The bottles 7 are delivered in upstanding position from the transfer wheel, having their bottoms resting on a suitable support 9, Fig. 4, and guided by a guide member 10, Fig. 3. A cam bar or rod 11, Figs. 3, 5 and 15, mounted on the machine frame, causes the bottles 7 to be shifted progressively from upstanding position to a position on their sides, resting on a support for tilting them from the position shown in Fig. 4 to a side position as shown in Fig. 6, with the open end of the bottle facing the plunger element or pusher 6. Each bucket 4, Fig. 12, also includes a centering collar 12 having an opening 13, Fig. 14, which corresponds with the bottle opening, and is in direct alinement therewith. Each bucket 4 includes the means for supporting the tablets arranged side by side and resting on their ends, a plunger or ejector element 6 for shifting stacked rows 14 of tablets laterally along grooves 15 in the bucket 4, Fig. 3, a centering collar 12 for the bottles 7, and bottle conveying sections 8. All the elements are movable at a predetermined correlated rate of speed so that the rows of tablets 14 in the grooves 15, Figs. 2 and 3, may be ejected and pushed progressively into the open ends of consecutive bottles, all in a continuous uninterrupted movement.

The rigid cam bar 11, Figs. 3 and 13, is arranged inwardly of the guide member 10 and comprises certain step formations and differences in thickness, so as to tilt the bottles 7 from the position shown in Fig. 4 to that shown in Fig. 5. This cam bar 11 also causes the bottles to be shifted from the tilted position shown in Fig. 5 to the horizontal position shown in Fig. 6. The tilting movement of the bottle from the vertical position shown in Fig. 4 to the horizontal position shown in Fig. 6 is a slow progressive one. The cam bar 11, Figs. 3 and 15, comprises a rear, relatively pointed end 16, which is adapted to engage the under side of the bottle when the bottle is in the position shown in Fig. 4, and then ride upwardly along the inclined surface 17, Fig. 15, so as to tilt the bottle with its open end inwardly, as shown in Fig. 5, the cam edge 17 engaging the bottom of the bottle at its outer edge, whereupon the bottle will be tipped. The continued operation of the moving buckets thus permits the outer peripheral edge of the bottle 7 to ride along the inclined edge 17 of the cam bar 11, tilted to the position shown in Fig. 5, and then permits it to drop downwardly, as shown in Fig. 6, whereupon the bottom of the bottles will engage the inner surface 18 of the cam bar, at which time it will be positioned directly opposite the centering collar 12 of a bucket. The rigid cam bar 11 also includes an inner inclined surface 19, which terminates in a straight surface 20 at the thickened outer end of the cam bar. The thickened end causes the surface 20 to force the bottles inwardly so that they then will have their open ends engaging the curved surface about the opening of the centering collars 12, Fig. 3. The forward continued movement of the buckets moves the bottles 7 to engage a series of plates 21, which forces the open end of the bottle in position against the opening in the centering collars 12. Springs 22 are arranged between the plates 21 and attached to a rigid guide member 23, whereby the plates 21 are spring urged toward the centering collar during the filling operation, Figs. 3 and 7.

The outer surfaces of the centering collars 12 around the central openings 13 are relatively conical in shape, as indcated at 24, Fig. 14. After the bottles 7 are arranged on their sides and forced into contacting engagement with the conical side edges 24, being pressed by springs 22, Figs. 3 and 7, each bottle 7 will be tightly clamped in proper position in a centering collar 12, with the opening 13 in proper direct alinement with a horizontal stack 14 of tablets for insertion in the neck opening of the bottle by an ejector or pusher 6.

Each slide pusher arm or pushing rod 6, Figs. 12 and 13, is arranged between spaced flanges 25, 25, Figs. 2 and 3, of the buckets 4 and is free for horizontal slidable movement. Each member 6, Figs. 2 and 12, carries a roller 26 near one end thereof, which roller is adapted to contact with a stationary cam bar 27, Figs. 2 and 12.

The cam bar 27 is substantially the shape disclosed in Figs. 2 and 12, so that during movement of the conveying buckets 4 by the conveyer chains 5 the rollers 26 will engage the cam bar 27 and push the pushers or arms 6 inwardly. The shape, construction and angularity of the cam bar 27 is such that it provides for the proper amount of horizontal lateral movement of the pusher members 6 with respect to the centering collars 12. Therefore, one part of the bar 27 (the upper end, Fig. 2) causes the pushers or plungers 6 to be shifted progressively inwardly, while the central or straight part of the bar maintains the plunger from sliding inwardly. The other end of the bar 27 (at the lower end, Fig. 2) inclines rapidly to effect faster inward movement of the pushers or plungers 6.

The ejector pushers or plungers 6, Figs. 2 and 3, move inwardly and push the horizontally stacked rows 14 of tablets through the opening 13 in the centering collar 12, the end 28, Fig. 13, of the pusher bars 6 extending through the opening 13 and into the open end of the bottle 7 to position the stack 14 of tablets into the bottle, the bottle 7 being of a diameter slightly greater, of course, than the diameter of the tablets so that the tablets will be received within the bottle. The diameter of the bottles, however, is still small enough to prevent any appreciable sideway shifting of the tablets within the bottle.

The ends 28 of the pushers 6 bear against the tablets and thus push the bottles 7 out of the buckets 4. The pusher or ejector elements 6 are provided with a projection or lip 29, Fig. 13, to permit contact or engagement with the rim of the bottle at the bottle opening, in such instances where there are insufficient tablets in the bottle, and thus push the bottles out of the buckets. The centering collar 12 is provided with a slot at the opening 13 to permit access of the lip 29 into and out of the collar, Fig. 14.

Immediately after the horizontal stacks 14 of tablets are received fully within the bottle, a second cam bar 30, Fig. 2, arranged in proper position with respect to the cam bar 27, will cause the slide elements or pushers 6 to be shifted outwardly to retract the slide plungers or pushers 6 away from the bottles 7 and return them to original position. After the retraction of the pushers or plungers 6, the filled bottles will continue to move to discharge position, the bottles being caused to be turned to vertical position by certain bar cams arranged beneath the filled bottles.

The bottles 7 rest on an extension or ledge of the buckets during their travel from horizontal position, Fig. 6, to their return to upright position (as shown to the right, Fig. 3). The plungers 6, after inserting a row 14 of tablets into a bottle, Fig. 8, cause the bottles to be pushed off the bucket ledge, Fig. 9, whereupon the bottle will be tilted downwardly as shown in Fig. 10, and rest upon a ledge 31, Figs. 10 and 11, being guided or end supported by a cam bar 32. As the projecting ends of a bucket are carrying the bottle, with a bottom edge of the bottle resting slidingly on the support 31, the cam bar 32 will cause the filled bottle to be returned to upright position (at the extreme right, Fig. 3).

The filled bottles, in upright position, are adapted to be conveyed to discharge position to a bottle capping machine. The filled bottles rest upon a conveyor 33 in the form of an endless belt, Fig. 3, where they are conveyed to a bottle capping machine. The filled bottles on the belt 33 are guided in their discharge path by side guides 34 and 35.

The cam bar 30, Fig. 2, is so constructed and operated that each pusher or plunger member 6 will be slid back to original position so that they will again engage the forward end of the cam bar 27 after the cycle is completed.

The operation of the various elements having been described throughout the specification, it is believed that further description of the operation need not be made.

The invention provides means operating continuously from the time the bottles are delivered until they are filled and conveyed to a capping machine. The machine of the invention is positive and efficient in operation, its various parts are properly timed, and inasmuch as some of the materials to be bottled would be likely to disintegrate, the bottle conveying and filling operations are done quickly.

The invention further provides means for conveying bottles continuously, the bottles first being delivered in upright position and then tilted on their sides, where they are filled by continuously moving stacks of articles, the bottles after being filled being returned to an upright position and then transferred to a conveyor to be conveyed to a bottle capping machine.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. A bottle conveying and filling machine comprising means for conveying successively arranged bottles moving continuously along a given path, means for maintaining said moving bottles in an upright position for a predetermined portion of travel, stationary means engaging successive bottles to tilt said bottles successively to position them on their sides throughout another portion of travel of the bottles, movable means engaging articles and inserting said articles in said bottles successively while the bottles are on their sides, and stationary means engaging successive bottles to tilt said bottles upwardly after being filled with articles to position said bottles on their bottoms.

2. A bottle conveying and filling machine comprising means for conveying successively arranged bottles continuously along a given path, means for maintaining said bottles in an upright position for a predetermined portion of travel, stationary means engaging successive bottles to tilt said bottles successively to position them on their sides throughout another portion of travel of the bottles, movable means engaging articles and inserting said articles in said bottles successively while the bottles are on their sides, stationary means engaging successive bottles to tilt said bottles upwardly after being filled with articles to position said bottles on their bottoms, and conveyer means to receive and convey said bottles for discharge to a capping machine.

3. A bottle conveying and filling machine comprising means for moving bottles successively and continuously along a given path, stationary means engaging successive bottles for tilting the moving bottles successively to position them on their sides, movable means for inserting continuously moving stacks of articles into said successively moving bottles to fill the bottles while the bottles lie on their sides, and stationary means to tilt said bottles vertically after being filled with said stacks of articles.

4. A bottle conveying and filling machine comprising means for moving bottles successively and continuously along a predetermined given path, stationary means engaging successive moving bottles for tilting the moving bottles to position them on their sides, movable means for inserting a predetermined quantity of continuously moving articles into said moving bottles to fill the bottles successively while the bottles lie on their sides, and stationary means engaging successive moving bottles to tilt said bottles vertically after being filled, said first named means comprising a moving endless chain of adjacent buckets.

5. A bottle conveying and filling machine comprising means for moving successively arranged bottles continuously along a given path, stationary means engaging successive bottles for tilting the moving bottles to position them on their sides, means for inserting continuously moving stack of articles into said moving bottles successively to fill the bottles while the bottles lie on their sides, and stationary means to tilt said successive bottles vertically after being filled, said first and third named means comprising rigid buckets connected to opposed moving chains.

6. A bottle conveying and filling machine comprising means for moving bottles successively and continuously along a predetermined given path, stationary means engaging said successive bottles for tilting the moving successive bottles to position them on their sides, means for inserting continuously moving stacks of articles into said moving bottles to fill the successive bottles while the bottles lie on their sides, and stationary means engaging the successive bottles to tilt said bottles vertically after being filled, said second and last named means comprising stationary cam bars.

7. A bottle conveying and filling machine comprising means for moving adjacent successively arranged bottles continuously along a given path, stationary means for tilting the moving adjacent successively arranged bottles to position them on their sides, movable means for inserting continuously moving stacks of articles into said moving bottles successively to fill the bottles while the bottles lie on their sides, and stationary means engaging successive filled bottles to tilt said bottles upwardly and vertically after being filled, said first and third named means comprising rigid buckets connected to opposed moving chains and said third named means carrying movable plungers, and said second and last named means comprising stationary cam bars.

8. A bottle conveying and filling machine comprising a constantly moving endless conveyor, stationary means supporting adjacent successively arranged bottles in upright position while being moved by said conveyor, stationary means engaging said successively arranged moving bottles to tilt said bottles progressively during movement by the conveyor to cause said bottles to lie on their sides for filling purposes, article supporting means on said conveyor, means on the conveyor to shift articles horizontally from the supporting means into successive bottles, rigid circular centering collars on said conveyor in alinement with said article supporting means, and means to center horizontally positioned bottles into contact with said centering collars.

9. A bottle conveying and filling machine comprising a constantly moving endless conveyor, stationary means supporting adjacent and successively arranged bottles in upright position while being moved by said conveyer, stationary means engaging said bottles successively to tilt said bottles progressively during movement of the bottles to cause said bottles to lie on their sides in a plane horizontal with the conveyor for filling purposes, horizontally disposed article supporting means on said conveyor, horizontally disposed upstanding circular centering collars on one side of said conveyer and in alinement with said article supporting means, and means including a tapered cup on the collars to center horizontally positioned bottles in said centering collars, said second named means comprising a stationary cam bar progressively increasing in size.

10. A bottle conveying and filling machine comprising a constantly moving endless conveyor, stationary means supporting adjacent successively arranged bottles in upright position while being moved by said conveyor, means to tilt said bottles progressively during movement to cause said bottles to lie on their sides for filling purposes, article supporting means on said conveyer, a plurality of articles on the article supporting means to be inserted into successive bottles, centering collars on one end of said conveyor in alinement with articles on said article supporting means, and means to center horizontally positioned bottles in said centering collars, and spring pressed means to press the bottles against the centering collars.

11. A bottle conveying and filling machine comprising a constantly moving endless conveyor, stationary means supporting bottles in upright position while being moved by said conveyer, means to tilt said bottles progressively during movement to cause said bottles to lie on their sides for filling purposes, article supporting means on said conveyer, centering collars on said conveyer and having tapered hollow ends in alinement with said article supporting means, means to center horizontally positioned bottles in the hollow tapered ends of said collars, spring pressed means to press the bottles against the centering collars with the open end of the bottle received in said tapered hollow ends, and means to eject articles from the article supporting means into said bottles through openings in the centering collars.

12. A bottle conveying and filling machine comprising a constantly moving endless horizontal conveyor, stationary means supporting adjacent successively arranged bottles in upright position while being moved by said conveyer, stationary means engageable with said bottle to tilt said bottles progressively during movement to cause said bottles to lie on their sides for filling purposes, article supporting means on said conveyor, open ended centering collars on said conveyer in alinement with said article supporting means, plunger means on the conveyer to eject articles from the conveyer and insert them into bottles successively, means to center horizontally positioned bottles in said centering collars, said last named means including a circular bevelled open end surrounding the openings in the collars, spring pressed means to press the bottles against the centering collars and guide the bottles by the bevelled ends, plunger means slidably mounted on the conveyer and in alinement with the openings in the collars, and means to operate said plunger means progressively to insert articles from the article supporting means through the openings in the collars and into said bottles.

13. A bottle conveying and filling machine comprising a constantly moving endless conveyor, stationary means supporting bottles in upright position while being moved by said conveyor, means to tilt said bottles progressively during movement to cause said bottles to lie on their sides for filling purposes, article supporting means on said conveyer, centering collars on said conveyer in alinement with said article supporting means, said collars having an opening therethrough with bevelled surfaces surrounding the opening, means including said bevelled surface to center horizontally positioned bottles in said centering collars, spring pressed means to press the bottles against the centering collars, plunger means slidably mounted on the conveyer and in alinement with the opening in a collar and a bottle, means to operate said plunger means progressively to insert articles from the article supporting means through said collar opening and into said bottles, and stationary means to tilt the bottles vertically after the articles are inserted therein.

14. A bottle conveying and filling machine comprising a constantly moving endless conveyor, stationary means supporting bottles in upright position while being moved by said conveyor, means to tilt said bottles progressively during movement to cause said bottles to lie on their sides for filling purposes, article supporting means on said conveyer, centering collars on said conveyor in alinement with said article supporting means, means to center horizontally positioned bottles in said centering collars, spring pressed means to press the bottles against the centering collars, plunger means slidably mounted on the conveyor and in alinement with the collars, means to operate said plunger means progressively to insert articles from the article supporting means through the collars and into said bottles, and means to tilt the bottle vertically after the articles are inserted therein, said last named means comprising a cam bar and a guide member.

15. A bottle conveying and filling machine comprising a constantly moving endless conveyor, stationary means supporting bottles in upright position while being moved by said conveyor, means to tilt said bottles progressively during movement to cause said bottles to lie on their sides for filling purposes, article supporting means on said conveyer, centering collars on said conveyer and having an opening therethrough in alinement with said article supporting means, means to nest the bottle necks in the collars and center horizontally positioned bottles in said centering collars, spring pressed means to press the bottles against the centering collars, plunger means slidably mounted on the conveyer and in alinement with the openings, means to operate said plunger means progressively to insert articles from the article supporting means through the openings in the collars and into said bottles, stationary means to tilt the bottle vertically after the articles are inserted therein, said last named means comprising a stationary cam bar and a guide member, means to retract said plungers after the bottle filling operation, and conveyer means receiving said filled bottles after the plungers are retracted.

16. A bottle conveying and bottle filling machine comprising a constantly moving endless conveyer made up of a plurality of adjacent buckets, stationary supporting means supporting said bottles in upright position with the opening at the top of each bottle, means on the buckets engaging the bottles to propel the bottles in adjacent successive arrangement, cam means to tilt the bottles downwardly to horizontal position in a plane inclined to the buckets and with the bottle openings facing inwardly toward the buckets, an open ended bevelled centering collar on each bucket, said buckets each having an elongated groove therein in alinement with the opening in the centering collar to receive horizontal stacks of tables arranged on end and in contacting relation, spring pressed means to urge the bottles tightly against the centering collars, and slidable plungers to shift a stack of said articles from each groove through a centering collar and into a bottle.

17. A bottle conveying and bottle filling machine comprising a constantly moving endless conveyer made up of a plurality of adjacent buckets, stationary supporting means supporting said bottles in upright position with the opening at the top of each bottle, means on the buckets engaging the bottles to propel the bottles, cam means to tilt the bottles downwardly to horizontal position with the bottle openings facing inwardly toward the buckets, a centering collar on each bucket, each collar having an opening therethrough and a bevelled surface about the opening, said buckets each having an elongated groove therein in alinement with the opening in the centering collar to receive horizontal stacks of tablets arranged on end and in contacting relation, spring pressed means to urge the bottles tightly against the centering collars, slidable plungers to shift a stack of said articles from each groove through a centering collar and into a bottle, each of said plungers being slidably mounted on a bucket, and a stationary cam bar to slidingly operate said plungers when said buckets arrive at certain predetermined positions.

18. A bottle conveying and bottle filling machine comprising a constantly moving endless conveyer made up of a plurality of adjacent buckets, stationary supporting means supporting said bottles in upright position with the opening at the top of each bottle, means on the buckets engaging the bottles to propel the bottles, cam means to tilt the bottles downwardly to horizontal position with the bottle openings facing inwardly toward the buckets, a centering collar on each bucket, each collar having an opening therethrough and a bevelled surface about the opening, said buckets each having an elongated groove therein in alinement with the opening in the centering collar to receive horizontal stacks of tablets arranged on end and in contacting relation, spring pressed means to urge the bottles tightly against the centering collars, slidable plungers to shift a stack of said articles from each groove through a centering collar and into a bottle, each of said plungers being slidably mounted on a bucket, a stationary cam bar to slidingly operate said plungers when said buckets arrive at certain predetermined positions, means to retract said plungers after the bottles are filled, and means to tilt said bottles upwardly after the retraction of said plungers.

19. A bottle conveying and bottle filling machine comprising a constantly moving endless conveyer made up of a plurality of adjacent buckets, stationary supporting means supporting said bottles in upright position with the opening at the top of each bottle, means on the buckets engaging the bottles to propel the bottles, cam means to tilt the bottles downwardly to horizontal position with the bottle openings facing inwardly toward the buckets, a centering collar on each bucket, each collar having an opening therethrough and a bevelled surface about the opening, said buckets each having an elongated groove therein in alinement with the opening in the centering collar to receive horizontal stacks of tablets arranged on end and in contacting relation, spring pressed means to urge the bottles tightly against the centering collars, slidable plungers to shift a stack of said articles from each group through a centering collar and into a bottle, each of said plungers being slidably mounted on a bucket, a stationary cam bar to slidingly operate said plungers when said buckets arrive at certain predetermined positions, means to retract said plungers after the bottles are filled, and means to tilt said bottles upwardly after the retraction of said plungers, said means to retract said plungers comprising a stationary cam bar and a roller on each plunger engaging the cam bar, said last named means to tilt the bottles comprising a stationary cam bar and a guide member.

References Cited in the file of this patent
UNITED STATES PATENTS

| | | |
|---|---|---|
| 2,631,767 | Banks | Mar. 17, 1953 |
| 2,642,212 | Currivan | June 16, 1953 |
| 2,662,355 | Ross | Dec. 15, 1953 |